B. R. SHOPP.
DENTAL SPATULA.
APPLICATION FILED AUG. 19, 1910.
977,906.
Patented Dec. 6, 1910.
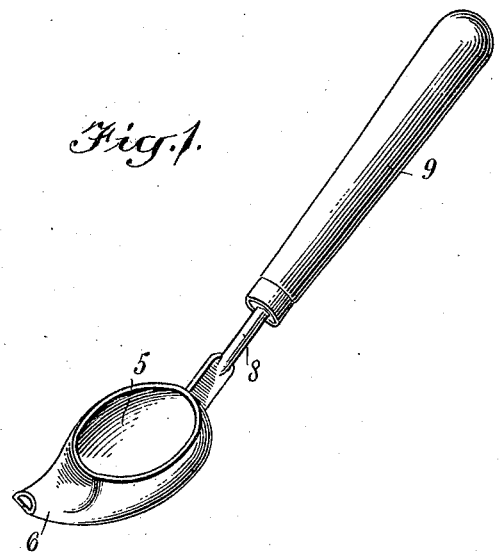
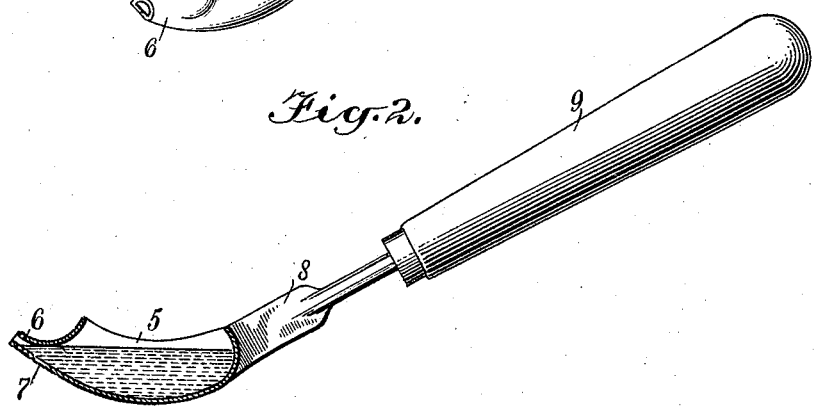
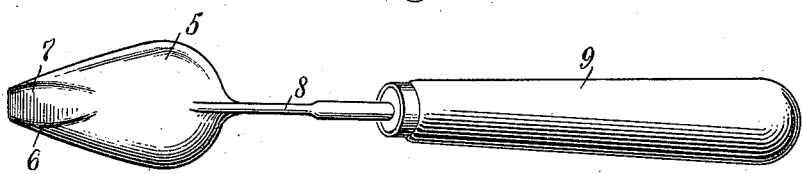
WITNESSES:
INVENTOR
Benjamin R. Shopp
BY
ATTORNEYS

UNITED STATES PATENT OFFICE.

BENJAMIN RICKARD SHOPP, OF WASHINGTON, CONNECTICUT.

DENTAL SPATULA.

977,906.  Specification of Letters Patent.  Patented Dec. 6, 1910.

Application filed August 19, 1910. Serial No. 577,920.

*To all whom it may concern:*

Be it known that I, BENJAMIN RICKARD SHOPP, a citizen of the United States, and a resident of Washington, in the county of Litchfield and State of Connecticut, have invented a new and Improved Dental Spatula, of which the following is a full, clear, and exact description.

The invention is an improvement in dental spatulas for waxing artificial teeth preparatory to the vulcanizing operation, and has in view a spatula having a receptacle or reservoir from which the wax is adapted to freely feed to the work when the spatula is heated, the spatula being so shaped as to be accessible to all portions of the plate and teeth where manipulation is necessary.

Reference is to be had to the accompanying drawings forming a part of this specification, in which similar characters of reference indicate corresponding parts in all the views.

Figure 1 is a perspective view of a spatula constructed in accordance with my invention; Fig. 2 is a side view of the same, showing the wax reservoir or bowl in longitudinal vertical section; and Fig. 3 is an inverted plan of the spatula.

In carrying out my invention, I provide a bowl or receptacle 5 for the wax, of suitable capacity, the forward portion of the bowl having an extended spout or discharge conduit 6 inclining outwardly and upwardly, the terminus of the spout being blunt and straight, with the under side of the spout flattened to provide a manipulating point or spatula proper 7. From the rear of the bowl extends a shank 8, to which is applied a suitable handle 9. The bowl of the spatula, as will be best seen from Fig. 3, uniformly decreases in width toward the point of the spout, and the spout is made relatively thin, which gives the spatula access to all portions of the plate and teeth where manipulation is necessary.

In the use of the instrument, the wax is placed in the bowl and the latter heated until the wax is thoroughly melted. The instrument is then held at such an angle in working on the plate and teeth as to provide a flow of wax on the work, ordinarily constant. The plate in this way can be made to the thickness desired. By changing the angle of the instrument, the flow of wax is cut off. By manipulating the wax of the plate with the warm spatula, the plate is readily thinned.

Having thus described my invention, I claim as new and desire to secure by Letters Patent:

1. The combination of a spatula, and a wax reservoir discharging at the point of the spatula.

2. A bowl having a handle, with the point of the bowl flattened at the under side to form a spatula.

3. The combination of a spatula, and a bowl formed in connection with the spatula, in which wax is adapted to be melted, and having a discharge passage leading to the point of the spatula.

4. The combination of a bowl having a handle and having a spout extending upwardly and outwardly therefrom, with the bottom of the spout shaped to form a spatula.

In testimony whereof I have signed my name to this specification in the presence of two subscribing witnesses.

BENJAMIN RICKARD SHOPP.

Witnesses:
ERNEST B. HUBBELL,
HATTIE B. SHOPP.